United States Patent [19]

Boyd et al.

[11] Patent Number: 4,923,928
[45] Date of Patent: May 8, 1990

[54] THERMOSETTING BISMALEIMIDE RESIN COMPOSITION CONTAINING AN ADDUCT OF A PROPENYLPHENOL AND AN EPOXY COMPOUND

[75] Inventors: Jack D. Boyd, Westminster; Hong-Son Ryang, Camarillo, both of Calif.

[73] Assignee: BASF Aktiengesellschaft, Ludwigshafen, Fed. Rep. of Germany

[21] Appl. No.: 156,983

[22] Filed: Feb. 18, 1988

[51] Int. Cl.$^5$ .................. C08F 299/02; C08L 79/08
[52] U.S. Cl. .................. 525/117; 525/422; 525/530
[58] Field of Search ............ 525/117, 529, 530, 42 R

[56] References Cited

U.S. PATENT DOCUMENTS

| 4,127,615 | 11/1978 | Zahir et al. | 525/529 |
| 4,130,600 | 12/1978 | Zahir et al. | 525/530 |
| 4,273,889 | 6/1981 | Yamazaki et al. | 525/529 |
| 4,384,129 | 5/1983 | Zahir et al. | 528/101 |
| 4,544,731 | 10/1985 | Cavitt et al. | 528/89 |
| 4,579,887 | 4/1986 | Mizusawa et al. | 523/423 |
| 4,708,996 | 11/1987 | Hoffman et al. | 525/531 |

FOREIGN PATENT DOCUMENTS 0230741  8/1987  European Pat. Off. .

Primary Examiner—John C. Bleutge
Assistant Examiner—Robert E. L. Sellers, II
Attorney, Agent, or Firm—William G. Conger

[57] ABSTRACT

Prereact modifiers prepared by reacting a propenylphenol with an epoxy resin are useful in toughening heat curable bismaleimide resin systems so as to minimize impact produced damage, and which have exceptional gel times.

14 Claims, No Drawings

THERMOSETTING BISMALEIMIDE RESIN COMPOSITION CONTAINING AN ADDUCT OF A PROPENYLPHENOL AND AN EPOXY COMPOUND

BACKGROUND OF THE INVENTION

1. Field of the Invention

The subject invention relates to heat-curable resin compositions. More particularly, the subject invention relates to bismaleimide resin systems which are cured in the presence of derivatized epoxy resins. The thermosetting resin systems find uses in structural adhesives and as matrix resins for prepregs and advanced structural composites.

2. Description of the Related Art

Both epoxy resins and bismaleimide resins have found increasing usefulness in high strength, high temperature applications in the structural materials field, for example, as candidates for structural adhesives and as matrix resins useful in heat-curable, fiber-reinforced prepregs. The bismaleimide resins, in particular, are noted for their high strength performance at elevated temperatures. Unfortunately, bismaleimide resins tend to be somewhat brittle, and thus subject to impact-induced damage. This susceptibility limits applications of the bismaleimides in the aerospace and transportation fields.

Epoxy resins generally cannot match the high strength characteristics of the bismaleimide resins in high temperature applications. Nevertheless, epoxy resins continue to be the major adhesive and prepregging resins in the structural materials field because of the higher flexibility and impact resistance which epoxies have to offer.

It would be desirable to modify the more brittle bismaleimide resins with epoxy resins. Attempts to do so have, thus far, not proven successful for several reasons. For example, it is known that epoxy resins are incompatible with the bismaleimide monomers and precipitate upon standing, as evidenced by U.S. Pat. Nos. 4,131,632 and 4,212,959. This physical incompatibility of the uncured monomers may result in the preparation of resin films or prepregs which do not have the desired monomer contents due to the settling out of the monomer precipitate. It may also cause local non-homogeneity which may unexpectedly alter the physical properties of the cured resin. In addition to these problems of physical imcompatibility, however, the epoxy and bismaleimide resins are chemically incompatible in the sense that they do not cross-cure.

In addition to the incompatibilities discussed above, the curing agents generally used with epoxy resins can create additional problems. Epoxy resins in high temperature, high strength applications are generally cured with amine-type curing agents, particularly 4,4'-diaminodiphenylsulfone and 4,4'-diaminodiphenylmethane. Unfortunately, these amine curing agents are also reactive with maleimides through a Michael-type reaction across the double bond. This reaction has been used in the past to prepare polyaminobismaleimides.

The reactivity of these amines with both epoxies and bismaleimides has the effect of altering the epoxy-amine stoichiometry. Moreover, it is difficult to overcome this effect because the magnitude of the various reactions is affected by the type of catalyst present, by the storage conditions of the uncured resin, and by the cure and postcure conditions.

It would be desirable to be able to formulate a resin system which can take advantage of the properties of both epoxy and bismaleimide resins without the above-mentioned problems. Such a resin system should provide a storage-stable, homogenous system which can cure in a predictable manner.

SUMMARY OF THE INVENTION

It has now been found that epoxy/maleimide resin systems may be prepared in which the epoxy and maleimide resins are compatible with each other and which cure to form a homogenous, substantially single phase system. These resin systems rely on the use of a prereact, which is preferably prepared by the reaction of a propenylphenol with an epoxy resin, to provide the compatibility between the epoxy and the maleimide. The cured resin shows good toughness and high strength at elevated temperatures, thus successfully combining the properties of the separate monomers. Most surprisingly, the analogous allylphenol derived prereacts fail to provide significant toughening, and further produce resins having undesirably long gel times.

The maleimides suitable for use in the subject invention are well known to those skilled in the art. These monomers are prepared by reacting maleic anhydride or substituted maleic anhydrides with an amine, preferably an aromatic diamine or mixtures of aromatic and aliphatic diamines to form bismaleimides. Tris- and tetrakismaleimides may also be useful in minor amounts, for example up to about 30 percent by weight based on the total weight of the maleimide component.

Preferred bismaleimides are eutectic mixtures of bismaleimides. Such mixtures comprise two or more bismaleimide monomers with the melting point of the mixture being lower than that of either monomer alone. Suitable monomers for such mixtures are bismaleimides derived from all aromatic diamines as well as those derived from aliphatic diamines. Polyaminobismaleimides are also useful, such as those prepared by reacting one or more bismaleimides with an aromatic or aliphatic diamine.

In addition to the bismaleimide resins useful with the modifiers of the subject invention, the heat curable resin systems may also contain numerous additional ingredients including fillers, dyes, pigments, rheology control agents and the like. The heat curable resin systems may also contain comonomers such as epoxy resins in relatively small amounts, cyanate resins, diamines, and particularly the o,o'-diallybisphenols. The resin systems may also contain thermoplastics such as the various polyarylene sulfides, sulfones, ketones, etherketones, and the like.

The prereact modifiers which are utilized in the resin formulations of the subject invention are conveniently and preferably prepared through the reaction of a propenylphenol with a bis- or polyfunctional epoxy resin. Alternatively, the prereact may be prepared through the reaction of a propenylphenoxy substituted monofunctional epoxy with a bis- or polyfunctional phenol. The products of these two methods of synthesis are both effective modifiers, but would be expected to have slightly different physical properties due to their quite different modes of preparation. One idealized formula for the modifiers may be written as follows:

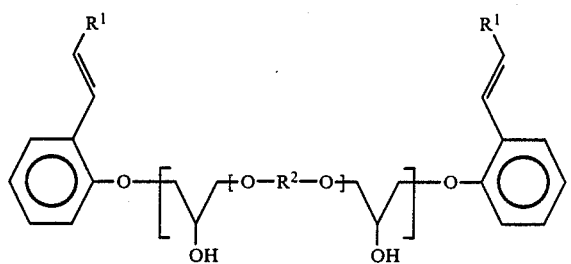

where $R^1$ is an essentially inert substituent such as $C_1$-$C_4$ lower alkyl, $C_1$-$C_4$ halogenated alkyl or aryl group. The group contained in the outer set of brackets is the residue from a bis-functional epoxy resin, while the group within the inner brackets is the residue of a difunctional phenol, depending upon the mode of preparation. The group $R^2$ is an organic group which may be the residuum of a dihydric phenol or alcohol; for example bisphenol A; bisphenol S; bisphenol F, 1,6-dihydroxynaphthalene; a hydroxyl-terminated oligomeric polyarylene ether, polyetherketone, polyethersulfone, or polyketonesulfone; or a phenolated dicyclopentadiene. The propenyl group is shown ortho to the "oxy" linkage, however it may be in other positions as the availability of the necessary monomers permits. A more general formula is:

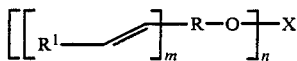

wherein $R^1$ is selected from the group consisting of $C_1$-$C_4$ lower alkyl, $C_1$-$C_4$ halogenated alkyl, and aryl radicals; wherein m is 1 or 2; wherein R is a mononuclear or polynuclear aromatic hydrocarbon; wherein n is a integer from 2 to about 4, and wherein X may be the residuum of an epoxy resin having an epoxy functionality of 2 to 4.

DESCRIPTION OF THE PREFERRED EMBODIMENTS

The bis- or polyfunctional epoxy resins which may be used to form the prereact modifiers in the resin systems of the subject invention are well known to those skilled in the art. A variety of such resins are described in the treatise by Lee and Neville, *Handbook of Epoxy Resins*, McGraw-Hill, Inc., ©1967. Particularly preferred epoxy resins are the glycidyl derivatives of di- to tetrafunctional alcohols, phenols, amines and aminophenols.

The difunctional epoxies, for example, include the so-called DGEBPA and DGEBPF resins which are the glycidyl ethers of bisphenols A and F respectively. The glycidyl ethers of other bisphenols and of mononuclear diphenols such as resorcinol, hydroquinone, and catechol may also be useful. Other difunctional resins include the glycidyl derivatives of monoamines such as aniline or toluidine.

Among the trifunctional epoxies which are useful are the glycidyl derivatives of tris[4-hydroxyphenyl]methane and p-aminophenol, particularly the latter. Tetrafunctional epoxies include the glycidyl derivatives of 1,1,2,2-tetrakis[4-hydroxyphenyl]ethane and a variety of diamines, particularly 4,4'-diaminodiphenylmethane.

Also preferred are the various phenolic and cresolic novolac-based epoxy resins.

However, a limited number of epoxy resins have been identified which produce composites having exceptional glass transition temperatures and impact resistance. Surprisingly, it has been found that there is no discernible relationship between the strength characteristics normally associated with the particular epoxies and systems containing the coupling agents or modifiers of the subject invention based upon these epoxies and bismaleimide resins. Thus, high strength epoxies such as 9,9-bis(4-glycidoxyphenyl)fluorene produce modifiers which result in cured products having properties not as good as those produced when using traditional epoxy resins such as the aforementioned DGEBPF resins Preferred epoxy resins which have been found to produce cured products having exceptional strength and toughness are, for example, the polyglycidyl ethers of phenolated dicyclopentadiene and polydicyclopentadienes as disclosed in U.S. Pat. 3,536,734; and the diglycidylethers of dihydroxynaphthalenes, especially 1,6-bis(glycidoxy)naphthalene, prepared by the process disclosed in U.S. Pat. No. 4,687,832.

The propenylphenols which are useful in preparing the prereact modifiers may be easily prepared from the corresponding allylethers by means of a Claisen rearrangement. When the ortho and para positions of the allylphenyl ether are available for the rearrangement, the ortho isomer is preferentially obtained. When both ortho positions are blocked, the para isomer is obtained. The allylphenols, generally o-allylphenols obtained as described above are then isomerized to propenylphenols in the presence of base, as described in *J. Am. Chem. Soc.*, 78, pp 1709-13 (1956).

Preferred propenylphenols are 2-propenylphenol and 4-propenylphenol and dipropenylphenols such as 2,4- and 2,6-dipropenylphenol. The corresponding propenylnaphthols and other moieties containing both a single hydroxyl functionality and one or more propenyl groups may also be used. The terpropenylphenol as used here and in the claims, refers to compounds having one or more propenyl or substituted propenyl groups attached to one or more aryl groups, the molecule as a whole having but one phenolic hydroxy group. Thus the definition does not incorporate compounds such as propenyldiphenols, i.e. propenylresorcinol, or dipropenylbisphenols, i.e. o,o'-dipropenylbisphenol A.

When the propenylphenol is reacted with the epoxy resin, a catalyst of the type which is effective in promoting the reaction between the epoxy group and phenolic hydroxyl groups is required. Examples of such catalysts are the tris-substituted phosphines and phosphonium salts, phosphoranylidene succinic acid derivatives such as those described in U.S. Pat. 4,320,222 and N-[3-phosphoranylidenyl-1-azacyclopentan-2,4-dione]-radical containing compounds. Additional examples of catalysts may be found in *Epoxy Resins, Chemistry and Technology*, Clayton May et. al., Ed., Marcel Dekker ©1973, at pages 268–270. Preferred catalysts are triphenylphosphine and N-[3-triaryl- and N-[3-trialkylphosphoranylidenyl]-1-azacyclopentane-2,4-dione-radical-containing catalysts. These latter catalysts are conveniently prepared by reacting a tris-substituted phosphine with a aleimide-group-containing compound in an inert solvent at temperatures of from about 0° to 25° C. The amount of catalyst used is from about 0.01 weight percent to about 10 weight percent based on the weight of propenylphenol plus epoxy, more preferably from about 0.1 wt. percent to about 1.0 wt. percent. An inhibitor such as butylated hydroxytoluene or butylated hydroxyanisole may be added to prevent unwanted side reactions, particularly premature polymerization of the ethylenic bonds.

When preparing the epoxy-propenylphenol prereact, the reaction generally takes place at elevated temperatures, for example from 80° C. to about 200° C., preferably from about 100° C. to about 200° C., and most preferably between 130° C. and 170° C. The reaction temperature may be adjusted within these ranges to take into account the chemical reactivities of the various ingredients and the nature and amount of catalyst.

The length of the reaction can vary from a few minutes to several days depending upon the ingredients, the temperature and the catalyst. The end point of the reaction may be determined by observing the change in the epoxy equivalent weight. The reaction is complete in the case where excess or stoichiometrically equivalent amounts of alkenyl phenol are used when the number of epoxy equivalents as measured by titration reaches zero, corresponding to an infinite epoxy equivalent weight. In the case where lesser amounts of alkenylphenol coupling agent are used, the reaction is complete when the epoxy equivalent weight reaches a maximum.

The prereact of the propenylphenol and the epoxy resin may range from a viscous resin to a brittle solid. If liquid, the prereact may be used as such to modify the bis- or polymaleimide resin. If solid, the prereact is generally finely ground and added to the maleimide resin to facilitate preparation of a homogenous product with minimal exposure to heat.

When the prereact modifiers are made by the less preferred alternative method, an alkenylphenoxy substituted monoepoxy compound is reacted with a bis- or higher functionality phenol. An example of the former type of compound is 1-glycidoxy-2-propenylbenzene

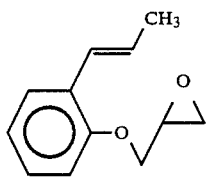

which may be prepared from 2-allylphenol by reaction with epichlorohydrin in the presence of base. Any allyl functionality which is not isomerized to propenyl functionality may be treated as disclosed earlier. Alternatively, allylphenol may be first rearranged to propenylphenol followed by reaction with epichlorohydrin.

Binuclear alkenyl/monoepoxy functional compounds may also be useful, although not as easily prepared as their mononuclear analogues. Examples of the latter are 4-glycidoxy-4'-propenyldiphenylmethane and 4-glycidoxy-3-propenyldiphenylmethane.

Suitable diphenols which may be useful in the alternative method of preparing the prereact modifiers include the readily available mononuclear and polynuclear difunctional phenolics such as resorcinol, hydroquinone, bisphenol A, bisphenol F, bisphenol S, the dihydroxynaphthalenes, particularly 1,6-dihydroxynaphthalene, the phenolated dicyclopentadiene resins described previously, and the oligomeric phenol terminated polysulfones, polyketones, polyetherketones, polyethersulfones and similar compounds having from 1 to about 5 repeating units with the proviso that the oligomer contain less than five aryl rings. These oligomers may be prepared by the process taught in U.S. Pat. 4,175,175.

In the alternative method of forming the prereact modifiers, the same reaction conditions are used as in the preferred method, the disappearance of the epoxy group being the talisman of the degree of reaction completion. In the claims, the prereact modifier is defined in terms of the residua of the reactants of the preferred method of preparation. However, it must be noted that these same residua may be obtained from the alternative method as well. Preparation and use of the prereact modifiers is illustrated by the examples which follow, which should not be construed as limiting the scope of the invention in any way.

EXAMPLE 1

A solution containing 220.2 g (1.64 equivalents) of 2-propenylphenol, 0.5 g triphenylphosphine, and 0.5 g butylated hydroxytoluene dissolved in 271.2 g (1.64 equivalents) of a bisphenol F derived epoxy resin (BGEBPF, Ciba-Geigy XB®-3336) is heated at 137°-143° C. for fifteen hours. The product is a viscous liquid.

EXAMPLES 2-4 AND COMPARATIVE EXAMPLES A-B

In similar fashion, 2-propenylphenol prereacts were formed from three additional epoxy resins. In each case, the epoxy and the propenylphenol were reacted in equivalent amounts, forming a viscous prereact or fusible solid. To compare the propenylphenol prereacts with allylphenol prereacts, 2-allylphenol was reacted with two epoxy resins in similar fashion. Table I below summarizes the composition of the various prereacts:

TABLE I

| Example | Alkenyl Phenol | Epoxy |
|---------|----------------|-------|
| 2 | 2-propenylphenol | GPDCPD[1] |
| 3 | 2-propenylphenol | BGN[2] |
| 4 | 2-Propenylphenol | BGPF[3] |
| A | 2-allylphenol | GPDCPD |
| B | 2-allylphenol | BGN |
| C | 2-allylphenol | BGPF |

[1] A glycidyl ether of the reaction product of phenol and dicyclopentadiene prepared by the process disclosed in U.S. Pat. No. 3,536,734.
[2] A glycidyl ether of 1,6-dihydroxynaphthalene, prepared by the process disclosed in U.S. Pat. No. 4,687,832.
[3] The bisglycidyl ether of 9,9-bis(4-hydroxyphenyl) fluorene.

EXAMPLE 5

A bismaleimide/epoxy heat-curable resin is prepared by combining 35 g of the bismaleimide of 4,4'-diaminodiphenylmethane, 35 g of Compimide®353, a eutectic blend of bismaleimides (available from Boots-Technochemie), 0.1 g triphenylphosphine, 1.9 g 2,2'-diallylbisphenol A, and 34 g of the alkenylphenol-/epoxy prereact of Example 1. The gel time of the mixture is 7 minutes at 177° C.

EXAMPLE 6

A 16 ply laminate is prepared from the resin prepared in accordance with Example 5 by impregnating Thornel T-300 3K 70PW carbon/graphite fabric (available from the Amoco Company) at 34 percent resin content, and curing the laminate at a pressure of 85 psi for 45 minutes at 120° C., 6 hours at 177° C., followed by a postcure of 3 hours at 232° C. Following a 5 day immersion in boiling water, test plaques exhibit a glass transition temperature of approximately 200° C.

EXAMPLES 7-18 AND COMPARATIVE Examples D-I

Epoxy/Bismaleimide heat-curable resins are prepared from the alkenylphenol/epoxy prereacts of Examples 2-4 and Comparative Examples A, B and C at various alkenylphenol/epoxy prereact content. Both 12 and 16 ply symmetrical panels are fabricated from Thornel T-300 3K 70PW woven carbon/graphite fiber impregnated at a 33±3 wt. percent resins content. The resin formulation consists of the stated weight percent of alkenylphenol/epoxy prereact with the balance of the composition being Compimide®353. Triphenylphosphine (0.1 wt. percent) is the catalyst. The laminates are cured using the same cure schedule as in Example 6, except for the DMA specimens which are cured 6 hours at 243° C.

Glass transition temperatures are measured on the twelve ply panels utilizing a Dupont 982 DMA instrument at a heating rate of 10° C./minute. Specimen size is 0.5 inch by 3.0 inch. Impact damage is assessed on the 16 ply panels by impacting the panels at an energy level of 230 in lb/in (147 KJ/m) and measuring the damage area by ultrasonic C-scan. The results are indicated in Table II below.

TABLE II

| Example | Alkenylphenol/epoxy Prereact from Example | % Prereact | Damage Area[1] After Impact | Dry $T_\Delta G'$ |
|---|---|---|---|---|
| 7 | 2 (propenyl/GPDCPD) | 35 | 14.2 | 305 |
| 8 | 2 (propenyl/GPDCPD) | 40 | 12.9 | 301 |
| 9 | 2 (propenyl/GPDCPD) | 45 | 13.6 | 295 |
| D | A (allyl/GPDCPD) | 20 | catastrophic failure | 308 |
| E | A (allyl/GPDCPD) | 30 | catastrophic failure | 303 |
| F | A (allyl/GPDCPD) | 40 | 29.0[3] | 281 |
| 10 | 3 (propenyl/BGN) | 34 | 15.5[2] | 307[2] |
| 11 | 3 (propenyl/BGN) | 40 | 15.5 | 297 |
| G | B (allyl/BGN) | 30 | 33.6 | 279 |
| 12 | 4 (propenyl/BGPF) | 30 | 50.3 | 300 |
| 13 | 4 (propenyl/BGPF) | 35 | 44.5 | 300 |
| 14 | 4 (propenyl/BGPF) | 40 | 29.0 | 297 |
| 15 | 4 (propenyl/BGPF) | 45 | 25.8 | 293 |
| H | C (allyl/BGPF) | 30 | catastrophic failure | 300 |
| I | C (allyl/BGPF) | 40 | catastrophic failure | 297 |
| 16 | 1 (propenyl/BGEBPF) | 35 | 23.2 | 307 |
| 17 | 1 (propenyl/BGEBPF) | 40 | 22.5 | 295 |
| 18 | 1 (propenyl/BGEBPF) | 45 | 17.4 | 282 |

[1]Damage Area in cm$^2$
[2]Average of two trials
[3]Break through by impactor

Table II indicates the superiority of propenylphenol/epoxy prereacts over allylphenol/epoxy prereacts, many of which produced laminates which failed catastrophically through extensive delamination, breakthrough, or both. It also show that the use of significant quantities of these prereacts, as opposed to toughening utilizing rubbery modifiers such as ATBN and CTBN elastomers, does not lower the $T_g$ to unacceptably low levels. Finally, the table shows quite graphically, that although the propenylphenol/epoxy prereacts are compatible with the bismaleimide no matter which epoxy is utilized, and although the formulations all possess superior toughness over unmodified bismaleimide formulations, that the GPDCPD and BGN epoxies unexpectedly produce exceptional values both with respect to impact damage resistance and glass transition temperature.

EXAMPLE J

A heat-curable bismaleimide composition is prepared by intimately mixing 60.0 g Compimide®353, 20.8 g of the bisglycidyl ether of 16-dihydroxynaphthalene, 19.2 g 2-propenylphenol, and 0.2 g of triphenylphosphine. This resin is used to prepare a 16 ply laminate as in Example 6. Table III compares the impact damage area of the BGN prereact modified bismaleimide and the formulation of this Example where the propenylphenol and epoxy are not prereacted.

TABLE III

| Example | Alkenylphenol/Epoxy From Example Modifier | % Modifier | Damage Area[1] After Impact |
|---|---|---|---|
| K | alkenylphenol + BGN epoxy (Not prereacted) | 40 | 38.7 |
| 11 | alkenyl phenol BGN prereact | 40 | 15.5 |

[1]Damage Area in cm$^2$

In addition to the unexpectedly greater superiority of the propenylphenol/epoxy prereacts over the corresponding allylphenol/epoxy prereacts, it has also been discovered that the propenylphenol/epoxy prereacts have drastically reduced gel times. This is most important in the manufacture of composites as resins with reduced gel times do not have as great a tendency to bleed out of the composite during cure. Table IV illustrates the difference in gel times.

TABLE IV

| Example | Alkenylphenol/Epoxy Prereact from Example | % Prereact | Gel Time[1] |
|---|---|---|---|
| 1 | C (allyl/BGPF) | 40 | 65 |
| 14 | 4 (propenyl/BGPF) | 40 | 18 |
| G | B (allyl/BGN) | 30 | 53 |
| 11 | 3 (propenyl/BGN) | 40 | 7 |
| F | A (allyl/GPDCPD) | 40 | 58 |
| 8 | 2 (propenyl/GPDCPD) | 40 | 7 |

[1]Gel time in minutes at 177° C.

The embodiments of the invention in which an exclusive privilege on property is claimed are defined as follows:

1. A heat curable resin composition comprising: (a) a maleimide-group-containing, heat curable resin, and (b) a toughening amount of one or more prereact modifiers prepared by reacting a propenylphenol with an epoxy resin, and having the formula:

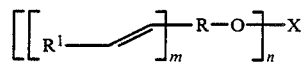

wherein $R^1$ is selected from the group consisting of $C_1$-$C_4$ lower alkyl, $C_1$-$C_4$ halogenated alkyl, and aryl radicals; wherein m is 1 or 2; wherein R is a mononuclear or polynuclear aromatic hydrocarbon; wherein n is an integer from 2 to about 4; and wherein X is the residuum of an epoxy resin having an epoxy functionality of 2 to 4.

2. The composition of claim 1 wherein $R^1$ is methyl, R is phenylene.

3. The composition of claim 2 wherein X is the residuum of an epoxy resin selected from the group consisting of the glycidyl ethers of 4,4,-dihydroxydiphenylmethane, the glycidyl ethers of 1,6-dihydroxynaphthalene, and the glycidyl eters of the phenolated dicyclopentadienes.

4. The heat-curable resin composition of claim 1 wherein said prereact comprises from 10 to about 50 weight percent of said composition.

5. The heat-curable resin composition of claim 2 wherein said prereact comprises from 10 to about 50 weight percent of said composition.

6. The heat-curable resin composition of claim 3 wherein said prereact comprises from 10 to about 50 weight percent of said composition.

7. The heat-curable resin composition of claim 1 wherein said prereact comprises from 30 to about 45 weight percent of said composition.

8. The heat-curable resin composition of claim 2 wherein said prereact comprises from 30 to about 45 weight percent of said composition.

9. The heat-curable resin composition of claim 3 wherein said prereact comprises from 30 to about 45 weight percent of said composition.

10. A heat-curable resin composition, comprising:
 (a) a maleimide-group-containing, heat-curable resin; and
 (b) a toughening amount of a prereact modifier having the formula

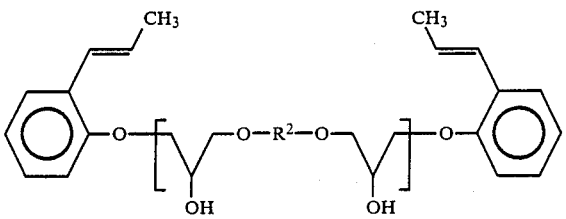

wherein the portion in brackets is the residuum of a difunctional epoxy resin derived from a dihydric alcohol or phenol containing an organic group $R^2$.

11. The composition of claim 10 wherein the bracketed portion is the residue of an epoxy resin selected from the group consisting of the glycidyl ethers of 1,6-dihydroxynaphthalene and phenolated dicyclopentadienes.

12. The heat-curable resin composition of claim 1 wherein the 177° C. gel time of said resin is less than about 20 minutes.

13. The heat-curable resin composition of claim 2 wherein the 177° C. gel time of said resin is less than about 20 minutes.

14. The heat-curable resin composition of claim 11 wherein the 177° C. gel time is less than about 10 minutes.

* * * * *